(12) United States Patent
Hashiguchi et al.

(10) Patent No.: US 7,630,049 B2
(45) Date of Patent: Dec. 8, 2009

(54) DISPLAY DEVICE AND METHOD WITH LOWER LAYER FILM FORMED ON SUBSTRATE BUT BETWEEN TRANSPARENT CONDUCTIVE FILM AND ORGANIC LAYER AND THEN PROTECTIVE FILM ON THE TRANSPARENT FILM

(75) Inventors: Takafumi Hashiguchi, Kumamoto (JP); Akio Nakayama, Kumamoto (JP); Yasushi Matsui, Kumamoto (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 574 days.

(21) Appl. No.: 11/106,601

(22) Filed: Apr. 15, 2005

(65) Prior Publication Data

US 2005/0231670 A1    Oct. 20, 2005

(30) Foreign Application Priority Data

Apr. 16, 2004    (JP)    ............................. 2004-120970

(51) Int. Cl.
  G02F 1/1345    (2006.01)
(52) U.S. Cl. .................. 349/152; 349/113; 349/114
(58) Field of Classification Search .............. 349/113, 349/114, 149–152
  See application file for complete search history.

(56) References Cited

U.S. PATENT DOCUMENTS 7,230,668 B2 *  6/2007  Lee et al. .................... 349/152
7,277,147 B2 * 10/2007  Miki et al. .................. 349/137
2003/0043316 A1  3/2003  Matsumoto et al.
2003/0160921 A1  8/2003  Nakashima et al.

FOREIGN PATENT DOCUMENTS

| JP | 60-164725 A | 8/1985 |
|---|---|---|
| JP | 61-160721 A | 7/1986 |
| JP | 5-242745 | 9/1993 |
| JP | 7-064112 | 3/1995 |
| JP | 8-160465 | 6/1996 |
| JP | 2000-089247 | 3/2000 |
| JP | 2002-287866 | 10/2002 |
| JP | 2003-168571 | 6/2003 |

(Continued)

OTHER PUBLICATIONS

Korean Office Action, dated Aug. 21, 2006, with English-language translation.

(Continued)

Primary Examiner—John Heyman
(74) Attorney, Agent, or Firm—Buchanan Ingersoll & Rooney PC

(57) ABSTRACT

A display device having a substrate provided with a display region includes a lower layer film formed on the substrate, a transparent conductive thin film formed on the lower layer film and electrically connected thereto, and a protective film formed on the transparent conductive film in a region other than the display region to prevent malformation of the transparent conductive thin film and the lower layer film.

6 Claims, 4 Drawing Sheets

FOREIGN PATENT DOCUMENTS

| | | |
|---|---|---|
| JP | 2003-248232 | 9/2003 |
| JP | 2004-061687 | 2/2004 |
| JP | 2004-094020 | 3/2004 |
| JP | 2004-212532 | 7/2004 |
| JP | 2005-091477 | 4/2005 |
| KR | 2003-0057122 | 7/2003 |
| TW | 494454 B | 7/2002 |

OTHER PUBLICATIONS

Notification of Reasons for Refusal issued in corresponding Japanese Patent Application No. 2004-120970, mailed Jun. 17, 2008, and an English translation thereof.

Office Action (with English language translation), from corresponding Taiwanese Application No. 094111802, mailed on Aug. 22, 2008.

* cited by examiner

DISPLAY DEVICE AND METHOD WITH LOWER LAYER FILM FORMED ON SUBSTRATE BUT BETWEEN TRANSPARENT CONDUCTIVE FILM AND ORGANIC LAYER AND THEN PROTECTIVE FILM ON THE TRANSPARENT FILM

BACKGROUND OF THE INVENTION

1. Field of the Invention

This invention relates to a display device such as a liquid crystal display device, EL (Electroluminescent) display device, plasma display device, etc. and a method for manufacturing the same.

2. Description of the Related Art

The above display device will be explained taking an example of a semi-transmissive liquid crystal display device (JP-A-2004-212532).

FIGS. 4A to 4F is a sectional view showing an example of a method for manufacturing a TFT (Thin-Film-Transistor) substrate employed for a conventional semi-transmissive liquid crystal display device. In FIGS. 4A to 4F, reference numeral 1 denotes a first metallic thin film, 2 a first insulating film, 3 a semiconductor active film, 4 an ohmic contact film, 5 a source electrode, 6 a drain electrode, 7 a second insulating film, 8 an organic film, and 9 a transparent conductive film. Reference numerals 10, 11 denote a third metallic film. The metallic film 10 is formed beneath the metallic film 11. Reference numeral 12 denotes one of contact holes.

Referring to FIGS. 4A to 4F, an explanation will be given of a method for manufacturing the TFT substrate. First, the first metallic thin film 1 is formed on a glass substrate by e.g. sputtering. Subsequently, in a first photolithography process, gate wirings, a gate electrodes and a gate terminals are formed. The first metallic thin film may be made of Cr, Mo, Ta, Ti, Al, Co, an alloy of one of these elements and a minute quantity of the other material added thereto, or a laminated film of these materials. In this process, a pattern of first metallic films 1 is formed on the substrate as shown in FIG. 4A.

Next, by plasma CVD, the first insulating film 2, semiconductor active film 3 and ohmic contact film 4 are successively deposited. The first insulating film 2 may be made of $SiN_x$, $SiO_y$, etc. which is used as a gate insulating film. The semiconductor active film 3 may be an amorphous silicon (a-Si) film or a polysilicon (p-Si) film. The ohmic contact film 4 may be an n-a-Si film or an n-p-Si film which is the a-Si film or the p-Si film doped with a minute quantity of e.g. phosphorus (P). Next, in a second photolithography process, the semiconductor active film 3 and ohmic contact film 4 are patterned in a region where at least a TFT part is to be formed. Thus, the structure as shown in FIG. 4B is formed.

Next, a second metallic thin film is deposited by e.g. sputtering. The second metallic thin film may be made of Cr, Mo, Ta, Ti, Al, Co, an alloy of one of these elements and a minute quantity of the other material added thereto, or a laminated film of these materials. Next, in a third photolithography process, the second metallic film is formed into the source electrode 5 and the drain electrode 6. Thereafter, the ohmic contact film 4 is etched. Through this process, a central region of the ohmic contact film 4 of the TFT part is removed so that the semiconductor active film 3 is exposed. Thus, the structure as shown in FIG. 4C is formed on the substrate.

Further, after the second insulating film 7 and the organic film 8 have been formed, these films are patterned in a fourth photolithography process. In a later step of this process, the contact holes 12 are made. Thus, the structure as shown in FIG. 4D is formed.

Further, the transparent conductive film 9 is formed and patterned in a fifth photolithography process. The transparent conductive thin film 9 may be a transparent conductive film of e.g. ITO (Indium Tin Oxide). Thus, the structure as shown in FIG. 4E is formed. Thereafter, the third metallic film 10, 11 is formed and patterned in a sixth photolithography process. Thus, the structure as shown in FIG. 4F is formed. The transparent conductive thin film 9 and the third metallic thin film 10, 11 serves as a pixel electrode for driving the liquid crystal display device. The part in which the transparent conductive thin film 9 is exposed is a transmitting part which transmits the light from backlight. The part in which the third metallic thin film 10, 11 is provided is a reflecting part which reflects external light.

The TFT array substrate made as described above is bonded to a CF (Color Filter) substrate equipped with opposite electrodes. Liquid crystal is injected in between these substrates. The resultant structure is placed on a light emitting side of a planar light source device. Thus, the semi-transmissive liquid crystal display device is manufactured.

Incidentally, there is disclosed a technique similar to the technique for stacking or layering a metallic film on a transparent conductive thin film limited by the means for solving the problem described later (JP-A-2000-89247), which will be described later.

Meanwhile, the semi-transmissive liquid crystal display device described above provides a fear of generating a display defect. In the course of an increasing demand for large-scaling and enhanced definition of the liquid crystal display device, suppressing this display defect is a very important problem.

The main cause leading to the above display defect is as follows.

The surface of the organic layer 8 stacked on the substrate actually is not flat but has a uneven shape. Therefore, the transparent conductive thin film 9 also cannot be stacked flatly on the organic layer 8, but actually provides an uneven shape and pin holes.

The third metallic thin film 10, 11 will be stacked on the transparent conductive thin film 9 with the unevenness and pinholes. And during the etching process of the third metallic thin films 10, 11, an etchant will soak into the pin holes or a region with a thin thickness of the transparent conductive thin film 9. Thus, the transparent conductive thin film 9 itself and the first and second metallic films beneath it will be etched so that the malformation of these films occurs. This leads to the display defect due to a wire break.

In the above description, by way example, the transparent conductive thin film 9 stacked on the organic layer 8 was explained. However, it is not true that the problem of flatness in the stacked layer is attributable to only the organic layer 8. The transparent conductive thin film stacked on the stacked layer with no evenness also suffers from the same problem. Further, although the problem to be solved was explained for the semi-transmissive liquid crystal display device, the same problem will occur in a general display device.

SUMMARY OF THE INVENTION

This invention has been accomplished in view of the problem described above. This invention provides a display device which can prevent malformation of a transparent conductive thin film and a lower layer to suppress a display defect, and a method for manufacturing such a display device.

The display device according to a first manner of this invention is a display device having a substrate provided with a display region, including a lower layer film formed on the substrate (for example, a first metallic thin film 1 in an embodiment of this invention), a transparent conductive thin film formed on the lower layer film and electrically connected thereto (for example, a transparent conductive thin film 9 in this embodiment), and a protective film (for example, a protective film 10b, 11b in this embodiment) formed on the transparent conductive film in a region (for example, a frame region 35 in this embodiment) other than the display region to prevent malformation of the transparent conductive thin film and the lower layer film.

In accordance with the display device described above, in a region other than the display region, the protective film is stacked on the transparent conductive film so that the transparent conductive film is capped. Thus, during the etching which is a step of forming an electrode pattern of the upper layer on the transparent conductive thin film, an etchant does not soaks into the transparent conductive thin film and lower layer. This prevents malformation of the transparent conductive thin film and the lower layer film, thereby suppressing a display defect.

The display device according to a second manner of this invention is a display device according to the first manner, characterized in that the protective film is a metallic film (protective film 10b, 11b in this embodiment).

The display device according to the second manner of this invention is particularly preferred when it is desired that the metallic film is stacked on the transparent conductive thin film in the display region. This is because the protective film employed in the region other than the display region can be used as the metallic film in the display region. This is preferred in e.g. a reflective liquid display device and a semi-transmissive liquid crystal display device in which a reflecting electrode is formed on the transparent conductive thin film.

Incidentally, JP-A-2000-89247 disclosed a technique for forming an Al thin film or Mo thin film on the transparent conductive thin film made of ITO.

However, in the invention disclosed in JP-A-2000-89247, the ITO film is directly stacked on the substrate whose surface flatness is assured. Therefore, a problem will not be presented that the ITO film provides an uneven shape or generates pin holes. Thus, JP-A-2000-89247 is neither involved with such a problem to be solved by the present invention, not to mention, nor suggest such a problem.

The display device according to a third manner of this invention is a display device according to the first or second manner, characterized in that an organic layer (for example, an organic layer 8 in this embodiment) is formed beneath the lower layer film.

As described above, the surface of the organic layer is actually uneven. Even where the uneven organic layer is formed beneath the lower film, the surface of the lower layer and transparent conductive film is uneven and the pin holes are generated, the following effect can be obtained by covering the transparent conductive with the protective film. Namely, in the step of stacking a layer on the transparent conductive thin film, the etchant will not soak into the pin holes, thereby preventing the malformation of the transparent conductive thin film and lower film.

The display device according to a fourth manner of this invention is a display device according to the first, second or third manner, characterized in that the protective film is formed in the same layer as a reflecting electrode (for example, reflecting electrode 10a, 11a in this embodiment) formed on the transparent conductive thin film.

In accordance with the display device according to the fourth manner of this invention, since the protective film is formed of the same layer as the pattern of the reflecting electrode, the manufacturing process can be simplified.

The method for manufacturing the display device according to the first manner of this invention is a method for manufacturing a display device having a substrate provided with a display region including forming a wiring on the substrate, forming a transparent conductive thin film connected to the wiring on the lower layer film, and forming a protective film on the transparent conductive film in an area other than the display region to prevent malformation of the transparent conductive thin film and the lower layer film.

In accordance with the method for manufacturing the display device described above, in a region other than the display region, the protective film is stacked on the transparent conductive film so that the transparent conductive film is capped. In the step of forming an electrode pattern on the upper layer on the transparent conductive thin film, the etchant does not soaks into the transparent conductive thin film and lower layer. This prevents malformation of the transparent conductive thin film and the lower layer film, thereby suppressing a display defect.

The method for manufacturing the display device according to the display device according to the second manner of this invention is a method for manufacturing a display device according to the method for manufacturing the display device according to the first manner of this invention, characterized in that the protective film is a metallic film (for example, protective film 10b, 11b).

The method for manufacturing the display device according to the second manner of this invention is particularly preferred when it is desired that the metallic film is stacked on the transparent conductive thin film in the display region. This is because the protective film employed in the region other than the display region can be formed in the same process as the metallic film in the display region. This is preferred in e.g. a reflective liquid display device and a semi-transmissive liquid crystal display device in which a reflecting electrode is formed on the transparent conductive thin film.

The method for manufacturing the display device according to a third manner of this invention is a display device according to the first or second manner, characterized in that an organic layer (for example, an organic layer 8 in this embodiment) is formed beneath the lower layer film.

As described above, the surface of the organic layer is actually uneven. Even where the uneven organic layer is formed beneath the lower film, the surface of the lower layer and transparent conductive film is uneven and the pin holes are generated, the following effect can be obtained by covering the transparent conductive with the protective film. Namely, in the step of stacking a layer on the transparent conductive thin film, the etchant will not soak into the pin holes, thereby preventing the malformation of the transparent conductive thin film and lower film.

The method for manufacturing the display device according to a fourth manner of this invention is a display device according to the first, second or third manner, characterized in that the protective film is formed in the same layer as a reflecting electrode (for example, reflecting electrode 10a, 11a in this embodiment) formed on the transparent conductive thin film.

In accordance with the display device according to the fourth manner of this invention, since the protective film is formed of the same layer as the pattern of the reflecting electrode, the manufacturing process can be simplified.

This invention gives a considerable advantage that exfoliation of the transparent conductive thin film and defect of the layer beneath it can be prevented, thereby suppressing display defect.

DETAILED DESCRIPTION OF THE INVENTION

Embodiment 1

An explanation will be given of an embodiment in which this invention is applied to a semi-transmissive liquid crystal display device.

Figure 1:
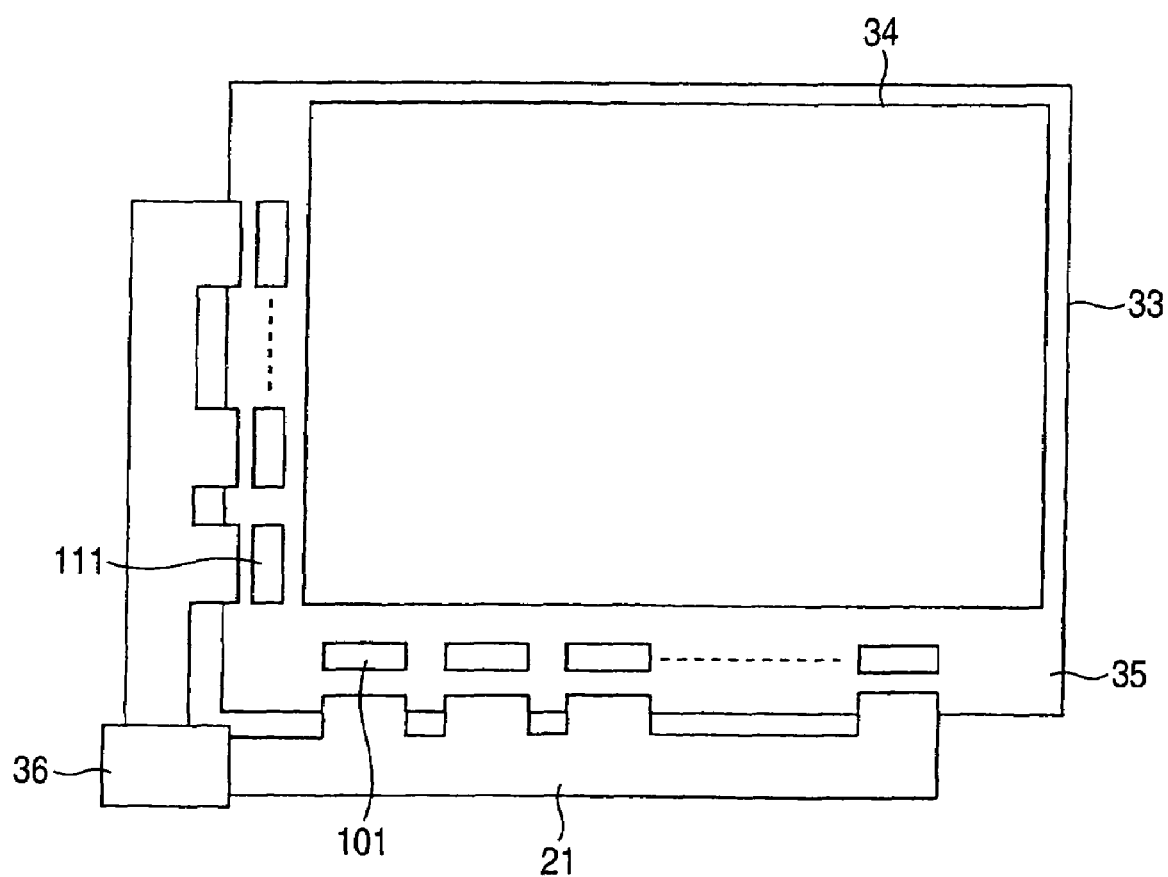
FIG. 1 is a top view showing the configuration of a liquid crystal display panel according to an embodiment of this invention.

FIG. 1 is a top view showing the configuration of a liquid crystal display panel of a COG (Chip On Glass) liquid crystal display device. As seen from FIG. 1, a liquid crystal display panel 33 includes a display region 34 composed of a plurality of pixels arranged in a matrix shape and a frame region 35 formed on the outer periphery thereof. The liquid crystal display panel 33 also includes an array substrate in which an array circuit is formed and an opposite substrate thereto. Liquid crystal is sandwiched between these two substrates. Each of the pixels on the array substrate is equipped with a TFT which is a switching element for controlling input/output of a display signal.

Within the display region 34 on the array substrate, a plurality of source wirings and gate wirings are arranged in a matrix shape. The source wirings and gate wirings are arranged so that they are superposed on each other at approximately right angles. The TFTs are arranged in the vicinity of the crossing points.

In the frame region 35 of the liquid crystal display device, a plurality of square source driver ICs 101 are aligned in a raw along the one side of the substrates. At the substrate end on the side perpendicular to the side where the source driver ICs 101 are provided, a plurality of gate driver ICs 111 are likewise aligned in a raw. The raw of the source driver ICs 101 is perpendicular to that of the gate driver ICs 111. The one side where the source driver ICs 101 are arranged is taken as the frame of the substrate. A planar light source device having a light source, light conducting plate and optical sheet is arranged on the rear surface of the liquid crystal panel 33.

The source driver ICs 101 and gate driver ICs 111 are attached to the glass substrate through an anisotropic conductive film (ACF).

On the lower surface of each driver IC, an input bump to be connected to the terminal of a wiring formed on a glass substrate is formed. The input bump and the terminal of the wiring are electrically connected to each other through the ACF. An image data signal, a clock signal, power for driving the ICs, etc. are supplied to the gate driver ICs 111 and source driver ICs 101 from a control circuit unit 36 through an EPC and the glass substrate. The signal from each driver IC is supplied to the gate wiring and source wiring to drive the corresponding switching element so that a voltage is applied to the pixel electrode. Thus, the liquid crystal is driven so that an image is displayed on the display region 34.

FIGS. 2A to 2G are a view for the flow of the process for manufacturing a TFT array substrate of a semi-transmissive liquid crystal display device according to an embodiment of this invention. In this manufacturing process, a semi-transmissive a-Si TFT array will be manufactured through seven times photolithography processes. In FIGS. 2A to 2G, reference numeral 1 denotes a first metallic thin film, 2 a first insulating film, 3 a semiconductor active film, 4 an ohmic contact film, 5 a source region, 6 a drain region, 7 a second insulating film, 8 an organic film, 9 a transparent conductive film, 10, 11 denote a third metallic film, 12 a contact hole, and 13 an underlying metallic thin film. The pattern shape as shown in FIGS. 2A to 2G includes a gate terminal part, a source part, a source wiring/gate wiring crossing part, a TFT part, a reflecting part of the display region and a transmitting part of the display region which are illustrated in order from the left side. The source terminal part and gate terminal part are connected to the driver ICs, respectively. On the reflecting part, the reflecting electrode for each pixel is provided. On the transmitting part, the transmitting electrode for each pixel is provided. The reflecting electrode and the transmitting electrode constitute the pixel electrode for each pixel.

First, the glass substrate serving as the insulating substrate is washed to clean the surface thereof. The insulating substrate may be a transparent insulating substrate such as a glass substrate. The insulating substrate may have any optional thickness, but is preferably 1.1 mm or less in order to reduce the thickness of the liquid crystal display device. If the insulating substrate is too thin, distortion of the substrate will occur which is attributable to thermal hysteresis during various kinds of deposition and processing. This leads to an inconvenience such as reduction in patterning accuracy. For this reason, the thickness of the insulating substrate must be selected considering the process to be implemented. Where the insulating substrate is made of a brittle fracture material such as glass, the edge face of the substrate is preferably chamfered in order to prevent mixing of foreign materials by chipping from the edge face. Further, the insulating substrate preferably has a partial notch in order to specify the orientation of the substrate. This is desired because capability of specifying the orientation of the substrate to be processed in each process facilitates management of the process.

Next, the first metallic thin film 1 is deposited by the technique such as sputtering. The first metallic thin film 1 may be a thin film having a thickness of 100 nm to 500 nm made of any one of Cr, Mo, Ta, Ti, Al, Co, and an alloy of one of these elements and a minute quantity of the other material added thereto. In a preferred embodiment, the thin film having a thickness of 200 nm made of Cr is employed. On the metallic thin film 1, the contact holes will be formed in a later step, and the transparent conductive thin film will be formed thereon. For this reason, the first metallic film 1 is preferably a metallic thin film which is difficult to bring about surface oxidation or has conductivity even when it is oxidized. At least the surface of the first metallic film 1 is preferably made of any one of Cr, Ti, Ta and Mo. Further, the first metallic thin film 1 may be a metallic thin film of stacked thin films of different kinds of metals or of different compositions in a film thickness direction. Further, where the first metallic thin film 1 is made of a material containing aluminum, at least its surface is preferably made of aluminum nitride having a specific resistance of about 10 to 1000 μΩ.

Figure 2A:
FIGS. 2A to 2G are a side sectional view showing the configuration in the process for manufacturing a liquid crystal display device according to an embodiment of this invention.

Next, the first metallic thin film 1 is patterned in the first photolithography process to form gate electrodes and gate wirings, auxiliary capacitor electrodes and an auxiliary capacitor wirings, gate terminals, etc. Thus, the structure as shown in FIG. 2A is formed. The photolithography process will be implemented as follows. After the TFT array substrate has been washed, photosensitive resist is applied and dried. Thereafter, light exposure and development are performed through the mask pattern having a predetermined pattern, thus forming the photoresist having the mask pattern duplicated photolithographically on the TFT array substrate. The photoresist, after having been heated and hardened, is etched so that it is removed. Where wettability between the photoresist and the TFT array substrate is poor so that repulsion of the photoresist occurs, the TFT array substrate is UV-washed before the photoresist is applied, or otherwise vapor of HMDS (hexamethyldisilizane) is applied for improving the wettability.

Where exfoliation of the photoresist occurs because of poor contact between the photoresist and TFT array, the processing of rising the temperature of heating/hardening and increasing the time therefor can be appropriately performed. The first metallic thin film 1 can be etched by the wet etching using a known etchant (for example, where the first metallic thin film 1 is made of Cr, a solution of mixture of cerium ammonium nitrate and nitric acid is used). Further, the first metallic thin film 1 is preferably etched to taper its pattern edge from the point of view of preventing the short-circuiting at a step formed with the other wiring. Now, the "taper" refers to etch the pattern edge so that its section is trapezoidal. In this process, although the gate electrodes and gate wirings, the auxiliary capacitor electrodes and auxiliary capacitor wirings were formed, other various marks and wirings necessary for manufacturing the TFT array substrate are formed.

Next, by plasma CVD, the first insulating film 2, semiconductor active film 3 and ohmic contact film 4 are successively deposited. The first insulating film 2 serving as the gate insulating film may be an $SiN_x$ film, $SiO_y$ film or $SiO_zN_w$ film, or a stacked film of these films (Incidentally, x, y, z and w represent integers). The film thickness of the first insulating film 2 may be about 300 nm to 600 nm. If the first insulating film 2 is too thin, short-circuiting is likely to occur at the crossing part of the gate wiring and the source wiring. It is preferred that the first insulating film 2 is not thinner than the first metallic film 1. If the first insulating film 2 is too thick, the ON current of the TFT becomes small, thereby deteriorating the display characteristic. For this reason, the first insulating film 2 is preferably as thin as possible. In a preferred embodiment, after an SiN film 300 nm thick has been deposited, another SiN film 100 nm thick is deposited, thereby forming the first insulating film 2.

The semiconductor active film 3 may be an amorphous silicon (a-Si) film or a polysilicon (p-Si) film. The film thickness of the semiconductor active film 3 may be about 100 nm to 300 nm. If the semiconductor active film 3 is too thin, it is likely to disappear when the ohmic contact film 4 is dry-etched as described later. If the semiconductor active film 3 is too thick, the ON current of the TFT becomes small. In consideration of these factors, the film thickness is selected according to controllability of the etching depth during the dry etching of the ohmic contact film 4 and a required ON current of the TFT. Where the semiconductor active film 3 is formed of the a-Si film, the interface between the a-Si film and the first insulating film 2 is preferably formed of the $SiN_x$ film or $SiO_zN_w$ film in view of the controllability and reliability of Vth of the TFT which is a gate voltage making the TFT conductive.

Where the semiconductor active film 3 is formed of the p-Si film, the interface of the p-Si film and the first insulating film 2 is preferably formed of the $SiO_y$ film or $SiO_zN_w$ film in view of the controllability and reliability of Vth of the TFT. Further, where the semiconductor active film 3 is to be formed of the a-Si film, the semiconductor active film 3 is preferably deposited at a lower deposition rate in the vicinity of the interface between itself and the first insulating film 2 and deposited at a higher deposition rate in the layer overlying the interface. This is because the TFT characteristic with a higher mobility can be obtained in a short deposition time and the leak current while the TFT is off can be decreased. In the preferred embodiment, the a-Si film 150 nm thick is deposited as the semiconductor active film 3.

The ohmic contact film 4 may be an n-a-Si film or n-p-Si film in which a-Si or p-Si is doped with a minute quantity of phosphorus (P). The film thickness of the ohmic contact film 4 may be about 20 nm to 70 nm. These $SiN_x$ film, $SiO_y$ film, $SiO_zN_w$ film, a-Si film, p-Si film, and n-a-Si film, n-p-Si film can be deposited using known gases ($SiH_4$, $NH_3$, $H_2$, $NO_2$, $PH_3$, $N_2$ and a mixed gas of these gases). In the preferred embodiment, the n-a-Si film 30 nm thick is deposited as the ohmic contact film 4.

Figure 2B:
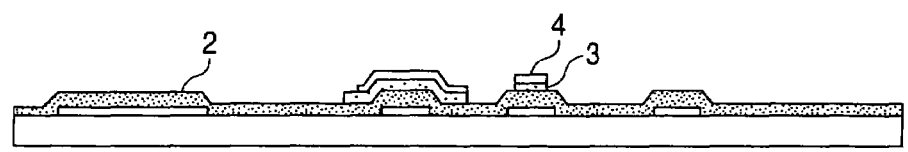

Next, in the second photolithography process, the semiconductor active film 3 and ohmic contact film 4 are patterned in the region where at least the TFT part is to be formed. Thus, the structure as shown in FIG. 2B is formed. The first insulating film 2 is left over the entire TFT array substrate. In addition to the region where the TFT part is to be formed, the semiconductor active film 3 and ohmic contact film 4 are preferably patterned to be left also in the region where the source wiring two-dimensionally crosses the gate wiring and auxiliary capacity. This is because the withstand voltage at the crossing region can be increased. Further, the semiconductor active film 3 and ohmic contact film 4 in the TFT part are preferably left as a continuous shape to the bottom of the source wiring. This is because the source electrode does not climb over the step formed by the semiconductor active film 3 and ohmic contact film 4 so that wire break at the step does not occur at the step.

The semiconductor active film 3 and ohmic contact film 4 can be dry-etched using a known gas composition (e.g. a mixed gas of $SF_6$ and $O_2$ or mixed gas of $CF_4$ and $O_2$).

Next, by the technique such as sputtering, the second metallic film is deposited. The second metallic film may be made of Cr, Mo, Ta, Ti, Al, Co, an alloy of one of these elements and a minute quantity of the other material added thereto, or a laminated film of these materials. It is of course that the second metallic film may be a stacked film of these materials. In the preferred embodiment, Cr is deposited to have a film thickness of 200 nm.

Figure 2C:
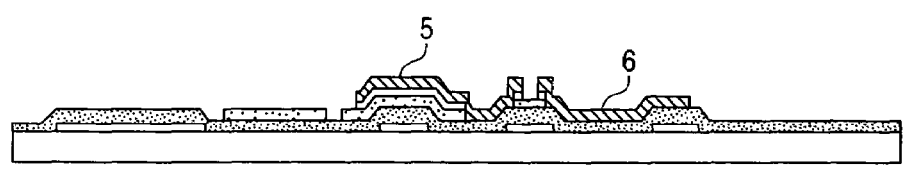

Next, in the third photolithography process, the second metallic thin film is patterned to form the source wiring, source terminal, source electrode 5 and drain electrode 6. Thus, the structure as shown in FIG. 2C is formed. The source electrode 5 is formed to reach the portion where the source wiring and the gate wiring cross each other. The drain electrode 6 is formed to reach the reflecting part. Next, the ohmic contact film 4 is etched. In this process, the central portion of the ohmic contact film 4 of the TFT part is removed so that the semiconductor active film 3 is exposed. The ohmic contact film 4 can be dry-etched using a known gas composition (e.g. a mixed gas of $SF_6$ and $O_2$ or mixed gas of $CF_4$ and $O_2$).

Next, by plasma CVD, the second insulating film 7 is formed. Further, from thereabove, the organic film 8 is formed. The second insulating film 7 can be formed of the same material as the first insulating film 2. In the preferred embodiment, the second insulating film 7 is made of SiN having a thickness of 100 nm. The organic film 8 may be a known photosensitive organic film, e.g. JSR-made PC335 or PC405. This organic film 8 is formed to have a thickness of about 3.0 to 4.0 µm, preferably 3.2 to 3.9 µm. Other film thicknesses may be adopted.

Figure 2D:
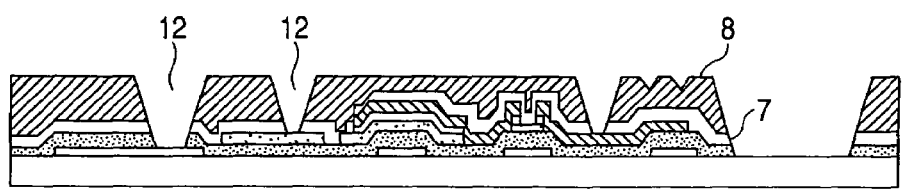

Next, in the fourth photolithography process, the organic film 8, second insulating film 7 and first insulating film 2 are patterned to have a shape as shown in FIG. 2D. In this process, the contact holes 12 employed for connection to the first metallic film electrode 1 are made. In this case, the surface of the organic film 8 may be made uneven. This permits external light to be scattered, thereby giving an improved display characteristic.

In the gate terminal part, in order to make the contact holes 12 each of which electrically connects the gate wiring and a driving signal source, the organic film 8 and both first insulating film 2 and second insulating film 7 are removed so that the first metallic thin film 1 is exposed. In the source terminal part, in order to make the contact holes 12 each of which electrically connects the source wiring and the driving signal source, the organic film 8 and second insulating film 7 are removed so that the second metallic thin film is exposed. Between the TFT part and the reflecting part, the organic film 8 and the second insulating film 7 are removed so that the drain electrode 6 is exposed. Further, in the transmitting part, the organic film 8 and both first insulating film 2 and second insulating film 7 are removed so that the first insulating substrate is exposed. Incidentally, the contact holes 12 can be formed in the same manner as described above.

Thereafter, in this embodiment, the underlying metallic thin film 13 is formed by the technique such as sputtering. Now, the underlying metallic thin film 13 may be a thin film having a thickness of about 100 nm to 500 nm made of e.g. of Cr, Mo, Ta, Ti, Al, Co, or an alloy of one of these elements and a minute quantity of the other material added thereto. The underlying metallic thin film 13 may be a stacked film of these materials. In the preferred embodiment, Cr is deposited to have a film thickness of 100 nm. In the fifth photolithography process, the underlying metallic thin film 13 is patterned.

Figure 2E:
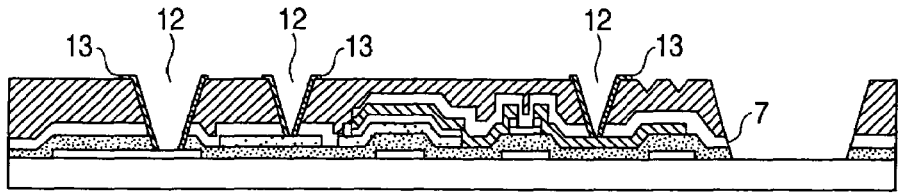
Figure 2F:
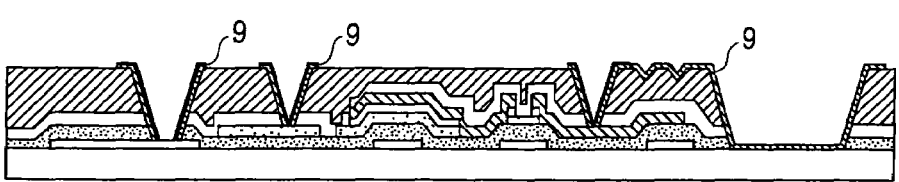

The underlying metallic thin film 13 is formed to overlie the contact holes 12 as shown in FIG. 2E, respectively. This is because if the first metallic layer 1, source electrode 5 and drain electrode 6 formed beneath the contact holes 12 are exposed, in patterning, they will be dissolved into the etching solution. Incidentally, the etching can be performed in the same manner as described above. The underlying metallic thin film 13 is in contact with to be electrically connected to the gate terminal, source electrode 5 and drain electrode 6 beneath each of the contact holes 12.

Next, by the technique such as sputtering, the transparent conductive thin film 9 is deposited. The transparent conductive thin film 9 may be a transparent conductive film made of ITO (Indium Tin Oxide), $SnO_2$, IZO (Indium Zinc Oxide), etc. ITO is preferably adopted from the point of view of chemical stability. In the preferred embodiment, the transparent conductive thin film 9 is a thin film of ITO having a thickness of 80 nm. Incidentally, ITO may be either crystallized ITO or amorphous ITO. However, if the amorphous ITO is employed, prior to depositing the third metallic film, the amorphous ITO must be heated to a crystallizing temperature of 180° C. or higher and crystallized.

Next, in the sixth photolithography process, the transparent conductive thin film 9 is patterned into a shape of pixel electrodes. The transparent thin film 9 can be etched by known wet etching according to the material to be used (for example, if the transparent conductive thin film 9 is made of the crystallized ITO, a water solution of hydrochloric acid and nitric acid is employed). Where the transparent conductive thin film 9 is made of ITO, it can be dry-etched using a known gas composition (e.g. HI, HBr) In this process, although a transmitting electrode is formed, a transfer pads for electrically connecting opposite electrodes of an opposite substrate and the common wiring of the TFT array substrate can also be formed.

Incidentally, in the case of etching the amorphous ITO, if it is done after heating, the transparent conductive thin film 9 is patterned in the same manner as in the crystallized ITO, and if it is done before heating, the transparent conductive thin film 9 is patterned using the water solution mixed with known oxalic acid. In the preferred embodiment, the amorphous ITO is deposited, etched using oxalic acid, and heated to 220 to 230° C. in the atmosphere before depositing the third metallic thin film. The transparent conductive thin film 9 provided on this transmitting part is employed to drive the liquid crystal. Since the transparent conductive thin film 9 formed on each of the gate electrode part and source terminal part is kept in contact with the underlying metallic thin film 13, it is electrically connected to the gate terminal, source electrode, and drain electrode.

Next, by the technique such as sputtering, the metallic thin film 10, 11 which constitutes the third metallic thin films are deposited. The third metallic thin film 10, 11 may be a thin film having a thickness of about 100 nm to 500 nm of e.g. Cr, Mo, Ta, Ti, Al, Co, Ag, an alloy of one of these elements and a minute quantity of the other material added thereto. It is of course that the third metallic film may be a stacked film of these materials. The metallic thin film 10 has a function of preventing a cut of the metallic thin film 11 from occurring at the step formed by the contact hole. If this cut can be disregarded, the provision of the metallic thin film 10 is not required. In this case, the number of steps can be reduced, thus permitting the production cost to be reduced. In the preferred embodiment, after Cr has been deposited to have a film thickness of 100 nm, an alloy having Al and Cu is deposited to have a film thickness of 300 nm, and further Cr is deposited to have a film thickness of 100 nm. If the alloy of Al and Cu is exposed, during the development in the subsequent lithography process, corrosion of the transparent conductive thin film 9 will advance. In order to prevent this, an uppermost layer of Cr is provided (not shown).

Next, in the seventh photolithography process, the third metallic thin film 10, 11 and the uppermost layer of Cr are patterned in a shape of a reflecting electrodes, and the uppermost layer of Cr is etched away, thereby forming the reflecting electrodes and protection film for the transparent conductive thin film 9. The third metallic thin film 10, 11 serves as the reflecting electrode 10a, 11a on the display region and as the protective film 10b, 11b (described later) in the frame region 35 other than the display region 34.

Figure 2G:
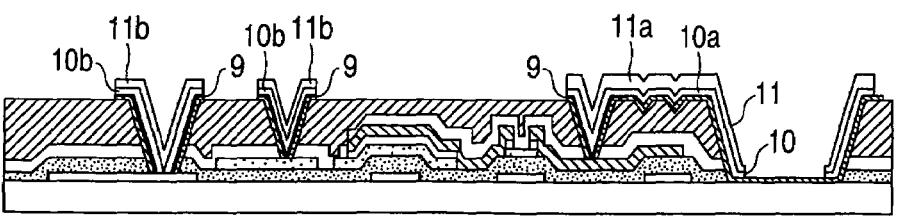

Additionally, where the metallic thin film 10 is made of Cr, it can be etched simultaneously with the uppermost layer of Cr by removing the resist after the metallic thin film 11 has been etched. The reflecting electrode is formed in a status where the metallic thin film 11 of the alloy of Al and Cu is stacked on the metallic thin film 10 of Cr. The uppermost layer of Cr, which has been formed for preventing corrosion of the transparent conductive thin film 9, will be removed in order to increase reflectance. The third metallic thin film 11, which is employed as the reflecting electrode, is preferably made of the material with high reflectance. The third metallic thin film 11 can be wet-etched using a known etchant. The third metallic thin film 11 provided in this reflecting part is served as the reflecting electrode. The liquid crystal is driven by the reflecting electrode and transmitting electrode. Finally, the structure as shown in FIG. 2G is formed.

An orientation film is applied from above the resultant structure. Further, by rubbing the orientation film, the TFT array substrate is manufactured. The TFT array substrate thus manufactured is bonded to a CF substrate having electrodes through a spacer. The liquid crystal is injected in between these substrates. By attaching the liquid crystal panel with the liquid crystal layer sandwiched therebetween to a backlight unit, the liquid crystal display device is manufactured.

Figure 3:
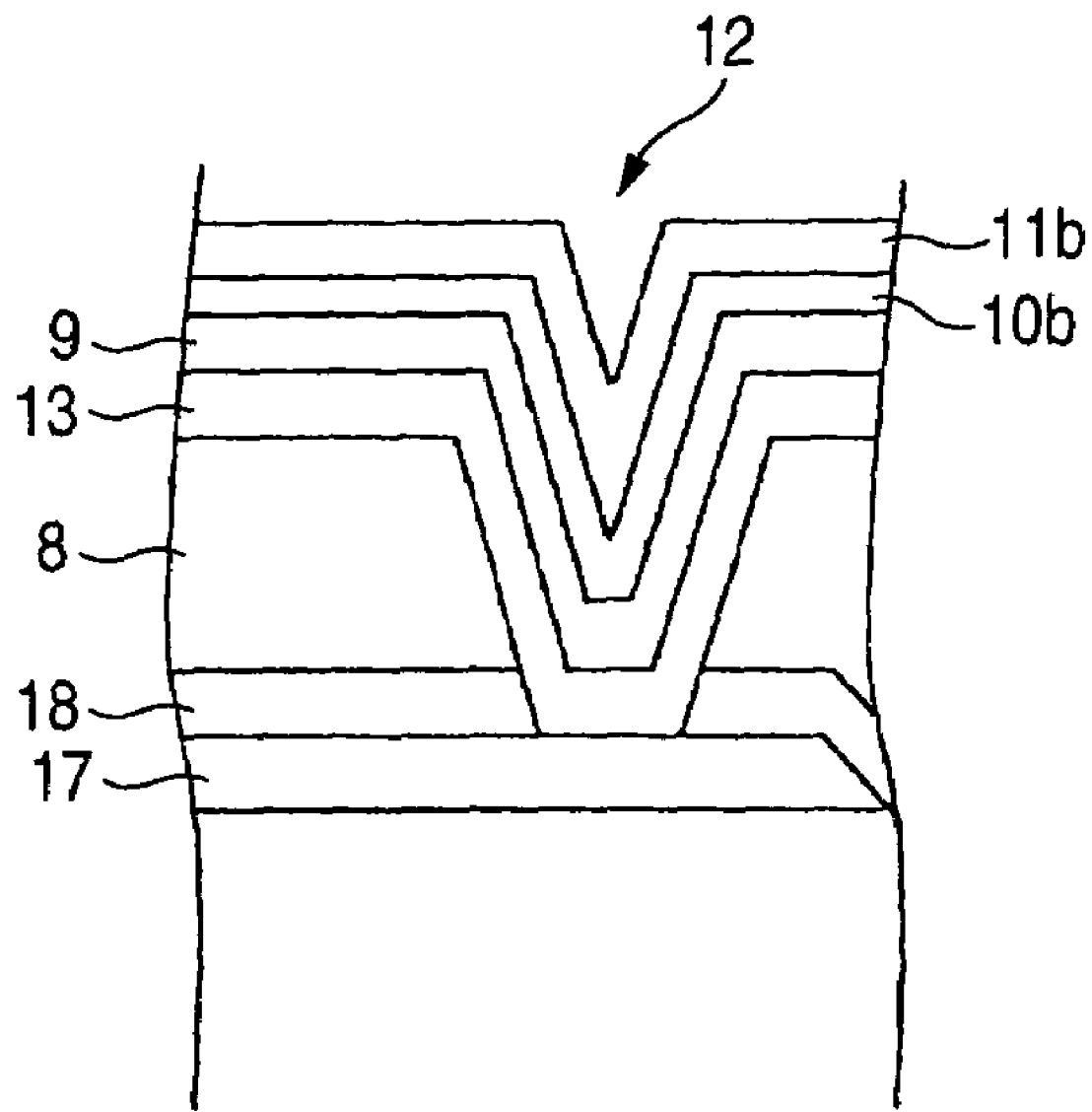
FIG. 3 is a side sectional view of the terminal portion in the TFT array substrate of the liquid crystal display device according to an embodiment of this invention.
Figure 4A:
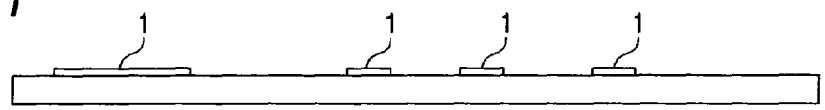
FIGS. 4A to 4F are a side sectional view showing the configuration in the process for manufacturing a conventional liquid crystal display device.
Figure 4B:
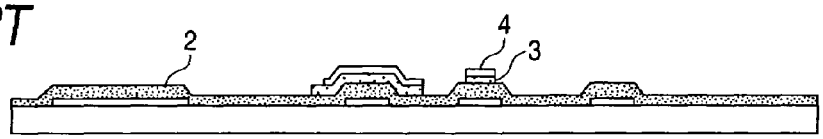
Figure 4C:
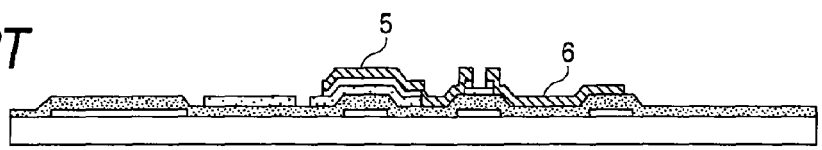
Figure 4D:
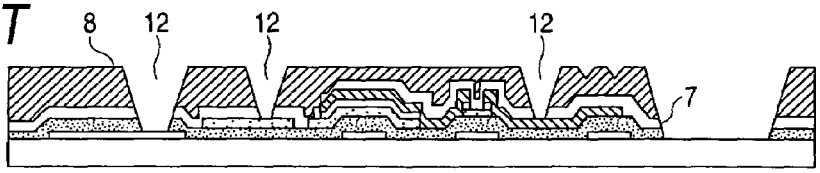
Figure 4E:
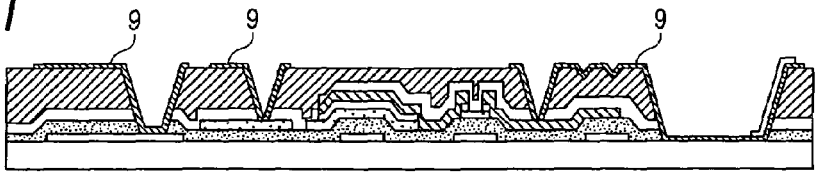
Figure 4F:
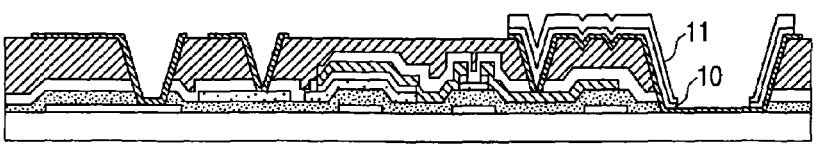

An explanation will be given of the terminal portion of the frame region 35 which is the characterizing part of this invention. FIG. 3 is a side sectional view showing a part of the terminal portion of the frame region 35. In FIG. 3, reference numeral 17 denotes a common wiring, 18 an insulating film, 12 a hole, 8 an organic film, 13 an underlying metallic film, 9 a transparent conductive thin film, and 10 a protection film (see FIG. 1). The source driver ICs 101 or the gate driver ICs 111 are mounted on the terminal portion.

The common wiring 17 is formed of the same layer as the first metallic thin film 1 or the source electrode 5 (drain electrode 6). The insulating film 18 is formed of the same layer as the first insulating film 2 or the second insulating film 7. The hole 12 is made by patterning the organic film 8 and the insulating film 18 through the dry etching step as described above.

The underlying metallic film 13 is formed on the organic film 8. On the underlying metallic film 13, the transparent conductive thin film 9 is formed. Further, on the transparent conductive thin film 9, the protective films 10b and 11b are formed. Thus, the transparent conductive thin film 9 is connected to the common wiring 17 through the underlying metallic film 13. The protective films 10b and 11b are also electrically connected to the transparent conductive thin film 9.

The protective film 10b, 11b is formed of the third metallic thin film 10, 11 in the same process as the reflecting electrode 10a, 11a in the display region 34 as described previously.

Conventionally, during the etching performed in order to provide the electrode pattern of the reflecting electrodes 10a and 11a in the display region 34, as the case may be, the etchant soaked into the pin holes or an area with a thin thickness of the transparent conductive thin film 9 in the frame region 35. Thus, the transparent conductive thin film 9 itself and its underlying film were etched. This led to the malformation (wire break, exfoliation and void) of the transparent conductive thin film 9 and its underlying film. Where the underlying metallic film 13 is stacked on the organic layer 8 with the uneven shape, since the above etching is more likely to occur, this problem was serious.

As a result that the surface of each layer was actually observed when the organic film 8, underlying metallic film 13 and transparent conductive thin film 9 have been stacked in the process of manufacturing the TFT array substrate, it was confirmed that the surface has the uneven shape.

In accordance with this mode for carrying out this invention, as shown in FIG. 3, the protective film 10b, 11b is stacked on the transparent conductive thin film 9 in the frame region 35 as shown in FIG. 3. Thus, the transparent conductive thin film 9 is capped so that it is not exposed. As a result, during the etching performed in order to provide the electrode pattern of the reflecting electrodes 10a and 11a in the display region 34, the etchant will not soak into the pin holes or an area with a thin thickness of the transparent conductive thin film 9 in the frame region 35. Accordingly, the malformation of the transparent conductive thin film and its underlying film will not occur. This suppresses the display defect, thereby providing the liquid crystal display device with high quality.

Incidentally, this mode for carrying out this invention has been explained for an example of the terminal portion in the frame region 35, but this invention should not be limited to this example. For example, this invention can be also applied to the terminals in the converting part for converting the wirings from the gate wiring layer in the frame region 35 to the source wiring layer, or testing terminal part for connecting devices.

Further, this mode for carrying out this invention has been explained for an example of the transparent conductive thin film stacked on the organic film 8 and underlying metallic film 13, but this invention should not be limited to this example. This invention can be applied to the case where an underlying film is formed beneath the transparent conductive thin film 9.

Further, this invention should not limited to a semi-transmissive liquid crystal display device, but applied to a general display device.

What is claimed is:

1. A display device having a substrate provided with a display region, comprising:
   a lower layer film formed on the substrate;
   a transparent conductive thin film formed on the lower layer film and electrically connected thereto; and
   a protective film formed on the transparent conductive film in a region other than the display region to prevent malformation of the transparent conductive thin film and the lower layer film, wherein an organic layer is formed beneath the lower layer film.

2. The display device according to claim 1, wherein the protective film is a metallic film.

3. The display device according to claim 1, wherein the protective film is formed in the same layer as a reflecting electrode formed on the transparent conductive thin film.

4. A method for manufacturing a display device having a substrate provided with a display region, comprising:
   forming a lower layer film on the substrate;
   forming a transparent conductive thin film electrically connected to the lower layer film on the lower layer film; and
   forming a protective film on the transparent conductive film in a region other than the display region to prevent malformation of the transparent conductive thin film and the lower layer film, wherein an organic layer is formed beneath the lower layer film.

5. The method for manufacturing a display device according to claim 4, wherein the protective film is a metallic film.

6. The method for manufacturing a display device according to claim 4, wherein the protective film is formed in the same layer as a reflecting electrode formed on the transparent conductive thin film.

* * * * *